Sept. 9, 1958     C. A. SUMTER     2,851,249

TIRE CASING SPREADER

Filed May 21, 1956

INVENTOR

Chester A. Sumter

BY    Lancaster, Allwine & Rommel

ATTORNEYS

United States Patent Office 2,851,249
Patented Sept. 9, 1958

2,851,249

TIRE CASING SPREADER

Chester A. Sumter, Knoxville, Tenn.

Application May 21, 1956, Serial No. 586,183

2 Claims. (Cl. 254—50.4)

This invention relates to improvements in tire casing spreaders.

A primary object of this invention is the provision of an improved spreader for opening the lip or bead margins of tire casings whereby to enable efficient inspection of the inside of the casing for breaks, nails, glass, punctures or other defects.

A further object of this invention is the provision of an efficient and useful time saving tire casing spreader which is light in weight and thereby readily portable, low priced, and which can be operated manually without the use of hydraulic or other power devices.

Other objects and advantages of this invention will be apparent during the course of the following detailed description.

In the accompanying drawing, forming a part of this specification, and wherein similar reference characters designate corresponding parts throughout the several views.

Figure 1:
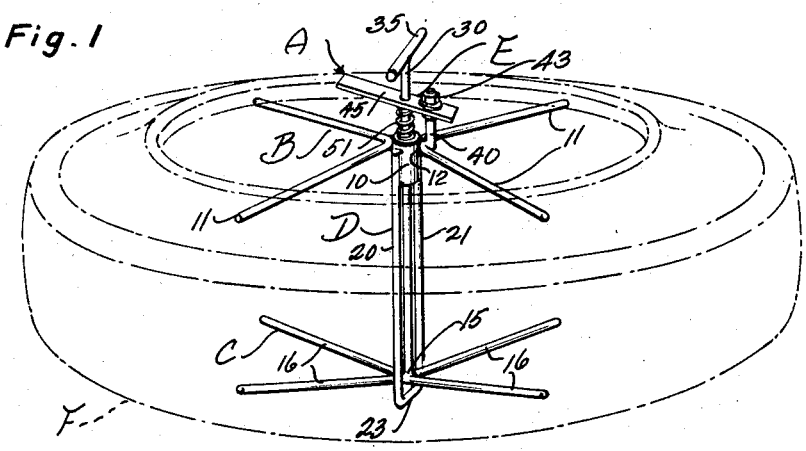
Figure 1 is a perspective view of the improved tire casing spreader, showing a tire casing in dotted lines and the spreader in position for opening the lip margins of the casing.

In the drawing, wherein for the purpose of illustration is shown only a preferred embodiment of the invention, the letter A may generally designate the improved manually operated tire casing spreader. It consists of upper and lower tire lip margin engaging members B and C, respective connected by means D which permits of their axial movement towards and away from each other. An improved self locking device E is used to permit free movement of the members B and C away from each other for locking them in their spaced relation against proximate movement until manually released.

The upper member B preferably comprises a sleeve or hub portion 10 having radially connected thereon a plurality of arms 11 which do not exactly lie in a plane at right angles to the axis of movement of said members, but which have a slight downward inclination to more accurately fit the slope of the interior surfaces of the tire lip margins. The arms 11 may be secured as by welding at 12 to the external surface of the sleeve 10.

Figure 2:
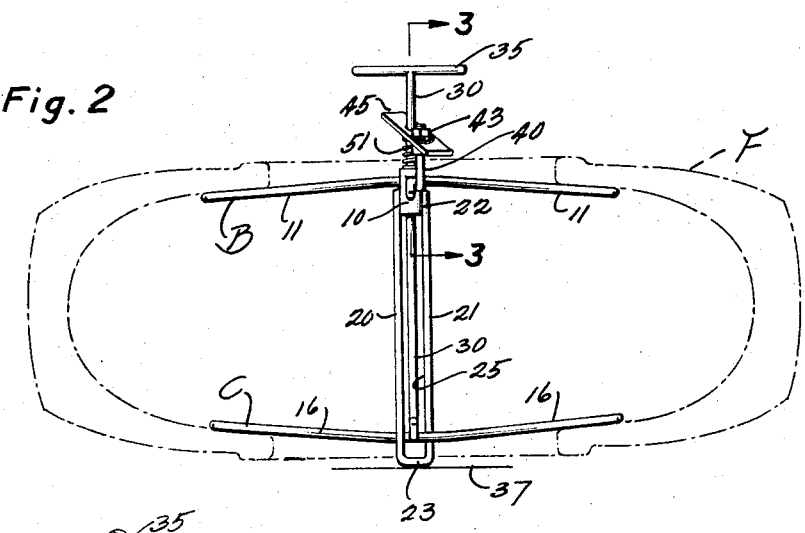
Figure 2 is a side elevation of the tire spreader showing its application upon a tire casing (in dotted lines).

The lower tire lip margin engaging member C preferably includes a hub portion 15 having radially extending tire casing lip engaging arms 16 which have a slight upward slope, as will be noted from Figure 2. The arms 11 and 16 are preferably circular in cross section and of sufficient strength to prevent bending under the force required to expand the lip margins of the casing.

Figure 3:
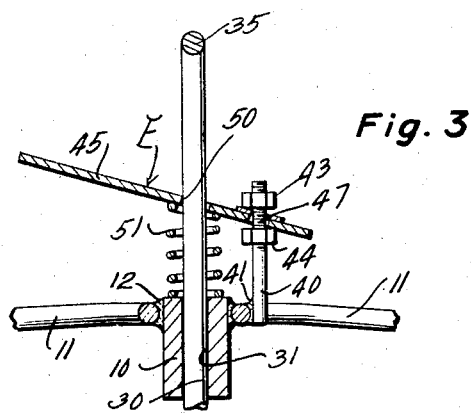
Figure 3 is an enlarged vertical cross sectional view taken through the self locking feature of the improved spreader substantially on the line 3—3 of Figure 2.

The means D includes a pair of spaced rods 20 and 21, defining a standard, the upper ends of which are welded at 22 externally upon the sleeve 10, and the lower ends of which are connected by a bight or ground engaging portion 23. The rods 20 and 21 are parallel and define a space 25 therebetween. The means D furthermore includes a central rod or axial standard 30 movably slidable in the passageway 31 of the sleeve 10, as shown in Figure 3; the upper end of which extends above the upper tire engaging member B, and at the top thereof, above the detent E, is provided with a cross handle 35. This rod 36 at its lower end is welded to hub 15. In use, the tire lip margin engaging portions B and C are moved proximately together and the ends of the arms 11 and 16 are then positioned within the tire casing. One convenient way of operating the appliance is to hold the bight portion or foot 23 of the standard, attached to the upper tire engaging member D, upon the ground, as indicated by the line 37 in Figure 2. The members B and C may then be moved away from each other by pushing downwardly upon the handle 35. This moves the tire lip engaging portions B and C away from each other to spread open the tire to the position indicated in Figures 1 and 2 of the drawings. Since the arms 11 and 16 are very small in cross section, the inside of the tire may be readily inspected; the lock mechanism E holding the members B and C in their spread apart position against liability of collapsing until manual release is effected. With the device A attached to the spread casing the tire may be rolled for ready inspection. Pressure is exerted uniformally upon the tire bead and lip margins so that there will be no undue distortion of the casing such as would be liable to injure the same; the lines of force being straight side only.

Referring to the automatically effective detent mechanism E, the same includes a supporting or mounting standard 40 welded at 41 upon the sleeve 10 or the weld adjacent thereto; the standard 40 paralleling the axis of the sleeve 10 but being spaced axially therefrom as will be noted from Figure 3. The standard 40 is provided with upper and lower nuts 43 and 44 threaded on the upper screw threaded end thereof which act as motion limiting means for the tiltable lock member 45. The lock member 45 is provided with an opening 47 therein. It may be reinforced if desired. It has a loose fit upon the standard 40 between the nuts 43 and 44, whereby the same may have a rocking or tilting movement. The lock member 45 is provideed with an opening 50 which loosely receives the rod or standard 30 which is fixedly connected to the casing tire lip engaging member C. A spiral compression spring 51 is located upon the rod 30 engaging the top sleeve 10 and the underside of the lock member 45 and normally urging the latter away from the sleeve 10 and into locking engagement at its sharpened edge surrounding the opening 50 with the rod 30.

It will be readily apparent from the foregoing that when the members B and C are spaced closely together and located within a tire casing, merely by pushing downwardly upon the handle 35 the rod 30 will slide freely through the opening 50 of the lock member 45 without the necessity of manually tilting the lock member 45. The spring 51 keeps the lock member 45 always in position to prevent any proximate movement of the members B and C. Thereby with a single push upon the handle 35 the operator may spread the tire lip margins through movement of the members B and C away from each other, and the lock member 45 under influence of the spring 51 will always bite into the rod 30 and hold the spread position of the tire means.

Various changes in the shape, size and arrangement of parts may be made to the form of invention herein shown and described, without departing from the spirit of the invention or scope of the claims.

I claim:

1. In a tire casing spreading appliance the combination of upper and lower tire lip margin engaging members each including a hub portion and radial casing lip engaging arms, the hub of the upper member being of sleeve like formation and providing a passageway therethrough, an elongated standard connected to said sleeve and extending in axial relation to the plane of the upper member and having a lower ground engaging foot, a shaft connected to the lower member and extending axially therefrom in parallel movable relation with the standard of the upper member, said shaft of the lower member being slidably connected to the standard of the upper member and holding the lower member above the foot of the standard of the upper member, the shaft of the lower member slidably extending through the pasageway of said sleeve and extending to a location above the upper member and there having a handle thereon.

2. A tire casing spreading appliance as described in claim 1, in which a self locking detent means is provided upon the upper member for releasably locking with the shaft of the lower member and which comprises a mounting standard connected with the upper member and extending upwardly therefrom in parallelism with said elongated standard and disposed laterally thereof, a lock bar tiltably mounted upon said mounting standard and having and opening therethrough loosely receiving said shaft therethrough, and spring means disposed between said sleeve and said lock bar normally holding the lock bar in position to engage and hold the shaft in said opening in order to automatically lock the said members in a tire spreading position.

References Cited in the file of this patent

UNITED STATES PATENTS

| | | |
|---|---|---|
| 2,174,489 | Groves | Sept. 26, 1939 |
| 2,323,144 | Long | June 29, 1943 |

FOREIGN PATENTS

| | | |
|---|---|---|
| 898,863 | Germany | Dec. 3, 1953 |